Patent [19] 3,860,935
Stauffer  [45] Jan. 14, 1975

[54] AUTO FOCUS CAMERA

[75] Inventor: Norman L. Stauffer, Englewood, Colo.

[73] Assignee: Honeywell Inc., Minneapolis, Minn.

[22] Filed: Dec. 19, 1973

[21] Appl. No.: 426,194

[52] U.S. Cl. ............... 354/25, 250/204, 250/234, 250/220 R, 352/140, 353/101, 354/31, 354/195
[51] Int. Cl. ............................................ G03b 3/10
[58] Field of Search ............. 354/25, 31, 195, 201; 353/101; 250/201, 204, 234, 220 R; 352/140

[56] References Cited
UNITED STATES PATENTS

| | | | |
|---|---|---|---|
| 3,336,851 | 8/1967 | Warshawsky | 354/25 |
| 3,450,883 | 6/1969 | Thomas | 250/204 |
| 3,571,598 | 3/1971 | Lombard, Jr. | 250/204 |
| 3,596,101 | 7/1971 | Someya et al. | 250/204 |
| 3,610,934 | 10/1971 | Turner | 354/195 X |
| 3,614,456 | 10/1971 | Hamisch | 250/234 |
| 3,691,922 | 9/1972 | Konig et al. | 354/25 |
| 3,708,619 | 1/1973 | Martin | 354/195 X |

Primary Examiner—Richard A. Wintercorn
Attorney, Agent, or Firm—Arthur H. Swanson

[57] ABSTRACT

An auto-focus camera including an objective lens device and a focal plane shutter has a first deflector device mounted on the focal plane shutter to reflect light from the objective lens device toward a second deflection device when the shutter is closed. The second deflection device, in turn, deflects radiation received thereby to form first and second auxiliary images of an object to be photographed on first and second arrays of light responsive elements, respectively. The second deflection device and the first and second arrays of light responsive elements are positioned out of the light path between the objective lens device and the focal plane shutter. As the objective lens is moved to vary the focus of the principal image to be formed on the light sensitive film of the camera, the intensity distribution of the first and second auxiliary images is also varied. The apparatus is so arranged that when the distributions of the first and second images are substantially equal, the objective lens is in a position to properly focus the principal image, of the object to be photographed, on the light sensitive film. A signal processing circuit connected between the light responsive elements and a control circuit responds to signals provided by the light responsive elements to determine when the distribution of the first and second auxiliary images are substantially equal at which time an "in focus" signal is provided to the control circuit to terminate the movement of the objective lens device. In another embodiment, the first and second arrays of light responsive elements are mounted on a non-reflective side of a reflex mirror in a single lens reflex camera.

16 Claims, 7 Drawing Figures

AUTO FOCUS CAMERA

CROSS REFERENCES TO RELATED APPLICATIONS

Subject matter disclosed but not claimed herein is disclosed and claimed in the following copending applications:

Ser. Nos. 377,809, and 377,810, filed on July 9, 1973;

Ser. Nos. 380,377, and 380,500, filed on July 18, 1973, now U.S. Pat. Nos. 3,838,275 and 3,836,772, respectively and Ser. Nos. 404,318, 404,319, and 404,320, filed on Oct. 9, 1973.

BACKGROUND OF THE INVENTION

The present invention relates generally to automatic focussing systems, and in particular to an automatic focus camera such as may be found, for example, in the United States Patent Office Class 95, sub class 44c, or Class 250, sub class 204, or Class 250, sub class 220, or Class 352, sub class 140.

DESCRIPTION OF THE PRIOR ART

Some prior art auto-focus cameras, while generally satisfactory, require a separate lens system for the automatic focussing function in addition to the objective lens required to expose the light sensitive film of the camera. That extra lens system required by the prior art auto-focus cameras made the camera more complex and necessarily more expensive. Some cameras do not require a separate lens system but utilize the light from the objective lens in determining the best focus position of the objective lens. However, in those cameras, a light borrowing device such as a semitransparent mirror or other light diminishing device in the light path between the objective lens and the light sensitive film is used to divert or characterize some of the light which would otherwise be used to expose the light sensitive film. In many instances that technique is undesirable.

SUMMARY OF THE INVENTION

It is, accordingly, an object of the present invention to provide an auto-focus camera requiring only one lens system to accomplish both the automatic focussing of the lens and the proper exposure of the light sensitive film.

It is another object of the present invention to provide an auto-focus camera as set forth which does not affect the light exposing the light sensitive film.

It is yet another object of the present invention to provide an auto-focus camera as set forth which is simple in design and relatively inexpensive to manufacture.

In accomplishing these and other objects, there has been provided, in accordance with the present invention, an auto-focus camera including a lens means for receiving light from an object to be photographed and forming a principal image of that object on a light sensitive film. A shutter means is positioned between the lens means and the light sensitive film. A first diversion means is operable, only when the shutter means is closed, to divert the light from a lens means to a second diversion means which, in turn, forms first and second auxiliary images of the object on first and second light responsive elements, respectively. The second diversion means and the first and second arrays are arranged outside of the light path between the lens means and the shutter means. A control circuit effects the movement of the lens means between predetermined limits to vary the condition of focus of the principal image as well as the distribution of the first and second auxiliary images. Circuit means are connected to the first and second arrays to detect when the light distribution of the first and second auxiliary images are substantially equal, at which time the principal image is in focus and the movement of the lens means is terminated.

BRIEF DESCRIPTION OF THE DRAWINGS

A better understanding of the present invention may be had from the following detailed description, when read in connection with the accompanying drawings, in which.

DESCRIPTION OF THE PREFERRED EMBODIMENTS

Figure 1:
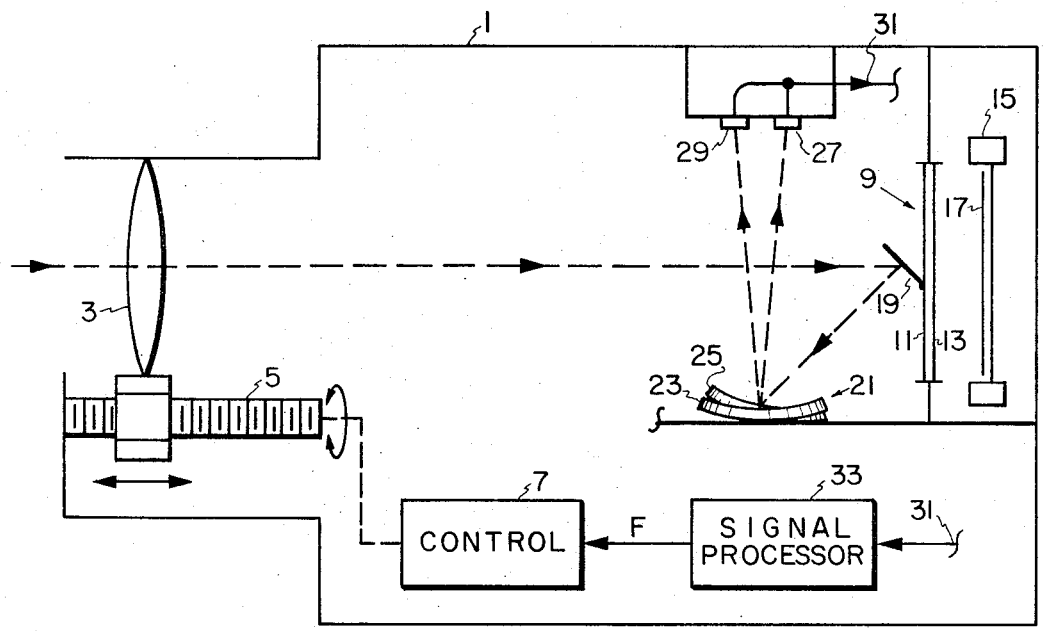
FIG. 1 is a schematic diagram of an embodiment of the present invention.
Figure 2:
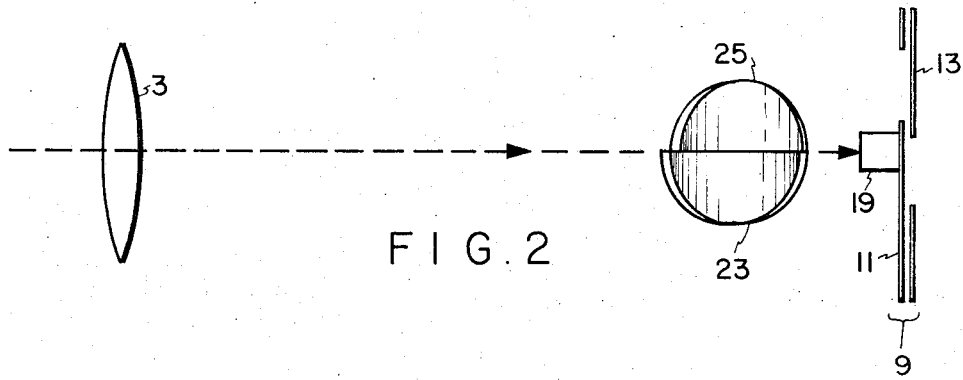
FIG. 2 is a plan view of a portion of the embodiment shown in FIG. 1.

Referring to FIG. 1 in detail, there is shown a camera means 1 which includes an objective lens means 3. The objective lens means 3 is movable between limits along a feedscrew 5, for example. The feedscrew 5 is driven by a reversible motor included within a control circuit 7. Radiation from an object to be photographed passes through the objective lens means 3 toward a focal plane shutter 9. The focal plane shutter 9 has first and second curtains 11 and 13, respectively. Means defining a film plane 15 are arranged behind the shutter 9 to receive a light sensitive film 17. When the focal plane shutter 9 is open, a principal image of the object to be photographed is formed on the light sensitive film 17. A first deflection means or mirror 19 is mounted on the first curtain 11 of the focal plane shutter in such a position that when the focal plane shutter 9 is closed, thereby blocking light passing through the objective lens 3 from exposing the light sensitive film 17, the first deflection means or mirror 19 deflects that light toward a second deflection means 21. However, when the focal plane shutter 9 is open, thereby exposing the light sensitive film 17, the first deflection means 19 is out of the light path between the objective lens means 3 and the light sensitive film 17; light from the objective lens 3 forms a principal image of the object to be photographed on the light sensitive film 17 and none of that light is deflected toward the second deflection means 21. In the present example, the second deflection means 21 includes first and second curved arcuate mirrors 23 and 25 (FIG. 2). The second deflection means 21 is operable, when the shutter 9 is closed, to receive the light reflected by the first deflection means and to form first and second auxiliary images of the object to be photographed on first and second sensing means 27 and 29, respectively. The signals generated by the first and second sensing means 27 and 29 are applied via conductors 31 to a signal processing circuit 33. The signal processing circuit 33, in turn, provides an output signal F which is applied to the control circuit 7 which may include a reversible motor, to control the positioning of the objective lens 3. A more detailed description of the effect that movement of the objective lens 3 has on the first and second auxiliary images is set forth in the above noted copending application Ser. No. 377,810, filed on July 9, 1973, which is included herein by reference. However, for the present purposes it is sufficient to note that as the objective lens 3 is moved, the intensity distribution of the first and second auxiliary images is varied and when the distribution of the first auxiliary image substantially equals the distribution of the second auxiliary image, the principal image on the light sensitive film 17 is in best focus.

Figure 3:
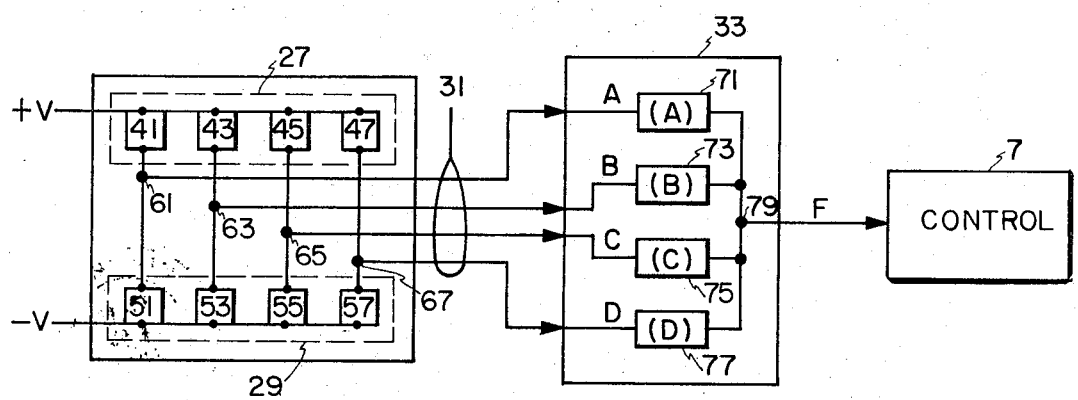
FIG. 3 is a schematic diagram showing an electrical circuit arrangement which may be used with the present invention.

The electrical connections between the first and second sensing means 27 and 29 in the signal processing circuit 33 are shown more specifically in FIG. 3. The first and second sensing means each include a corresponding number of photoresponsive elements. In the present example, the first sensing means 27 includes four photoresistors 41, 43, 45 and 47. The second sensing means 29 also includes four corresponding photoresistors 51, 53, 55 and 57. As shown in FIG. 3, the correspondence between the photoresponsive elements of the first and second sensing means 27 and 29 is based upon the relative position of each photoresponsive element with respect to the sensing means of which it forms a part. The photoresistors in the first sensing means 27 all have a common terminal connected to a first potential +V. The photoresistors of the second sensing means 29 have a common terminal connected to a econd potential −V. The other terminals of corresponding photoresistive elements are connected together at common points 61, 63, 65 and 67, respectively. Separate leads 31 connect those common points to the signal processing circuit 33 to provide the difference signals A, B, C and D, respectively. The signal processing circuit 33 includes four absolute value determining circuits 71, 73, 75 and 77. A summing junction 79 sums the absolute value of the difference signals A, B, C and D to provide an output focus signal F for application to the control circuit 7.

In operation, before taking a picture, a photographer will initiate the automatic focussing cycle at which time the objective lens 3 will begin its movement along the feedscrew 5 thereby varying the condition of focus of the principal image which, if the shutter were open, would be formed on the light sensitive film 17. However, since, during the automatic focussing cycle, the focal plane shutter 9 is closed, the first deflection means 19 is in the light path between the objective lens means 3 and the light sensitive film 17. Therefore, light from the objective lens means 3 forms an image on the mirror 19 and radiation therefrom is deflected toward the second deflection means 21. The orientation of the first and second arcuate mirrors 23 and 25 of the second deflection means 21 is so designed that when the objective lens means 3 is in a position which would cause the principal image formed on the light sensitive film 17 to be properly focussed, the light distribution patterns of the first and second auxiliary images are similarly positioned upon the first and second sensing means 27 and 29, respectively, and the distribution of the first auxiliary image is substantially equal to the distribution of the second auxiliary image. When the primary image is properly focussed, corresponding photo resistive elements 41 and 51, 43 and 53, 45 and 55, 47 and 57, will be equally illuminated and the potential appearing at the common points 61, 63, 65 and 67 will be substantially zero volts. Even if the response characteristics of corresponding photo resistive elements are not identical, the difference signals, A, B, C and D will exhibit a minimum deviation from zero volts when the images formed on the first and second sensing means 27 and 29 are similarly distributed. The difference signals A, B, C and D are applied to the signal processing circuit 33 and the absolute values of those signals are determined. Those absolute value difference signals are summed at the summing junction 79 to provide the output focus signal F. When the output focus signal F is at a minimal level, the control circuit 7 senses the minimal level and terminates the movement of the objective lens means 3. The objective lens means 3 is then in the proper focus position and the photographer may proceed to photograph his object by actuating a shutter switch (not shown) to open the focal plane shutter 9. When the focal plane shutter 9 is open, the first deflection means 19 is moved out of the light path between the objective lens means 3 and the light sensitive film 17, and the light passing through the objective lens means 3 will form a properly focussed principal image of the object to be photographed on the light sensitive film 17.

Figure 4:
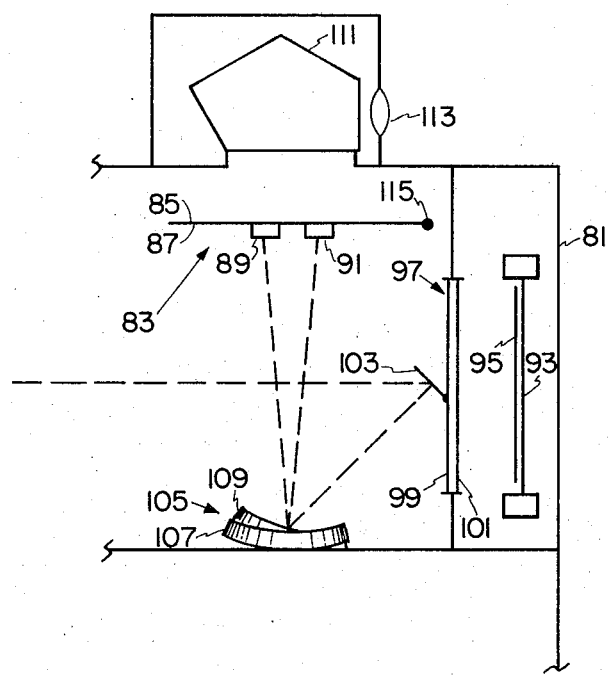
FIG. 4 is a schematic diagram of another embodiment of the present invention.

The automatic focussing arrangement of the present invention may also be applied to a single lens reflex (SLR) camera 81, as partially shown in FIG. 4. The SLR camera 81 includes a reflex mirror 83 having reflective and non-reflective faces, 85 and 87, respectively. First and second light sensing means 89 and 91 are mounted on the non-reflective face 87 of the reflex mirror 83. The SLR camera 81 also includes means defining a film plane 93 for receiving a light sensitive film 95. A focal plane shutter 97 includes first and second curtains 99 and 101, respectively. A first deflecting means 103 is mounted on the first curtain 99 of the focal plane shutter 97 to deflect radiation falling thereon toward a second deflection means 105. The second deflection means 105 includes first and second arcuate mirrors 107 and 109 for forming first and second auxiliary images of the object to be photographed on the first and second sensing means 89 and 91, respectively.

In operation, when a photographer sights upon the object to be photographed, the reflex mirror 83 is in a down position (not shown) at which time the reflex mirror 83 is positioned at a 45° angle with respect to the optical axis of the camera. Radiation from the objective lens means is then reflected by the reflective face 85 of the reflex mirror 83 to a prism 111 through which the photographer will see the object by looking through a viewing lens 113. After sighting on the object to be photographed, the photographer will then initiate an automatic focussing cycle at which time the reflex mirror 83 will pivot about an axis 115 to the position shown in FIG. 4. Light from the objective lens will be deflected by the first deflecting means 103 toward the second deflecting means 105. The second deflecting means 105 will then form first and second auxiliary images of the object to be photographed on the first and second light sensing means 89 and 91, respectively. A signal processing circuit and a control circuit as shown in FIG. 1, are also included in the single lens reflex camera of FIG. 4 and the automatic focussing cycle is accomplished in the same manner as hereinbefore explained in connection with the camera 1 shown in FIG. 1. The automatic focussing cycle is accomplished so rapidly that the auto-focus apparatus of the present invention may be included in hand-held cameras as well as mounted cameras.

Figure 5:
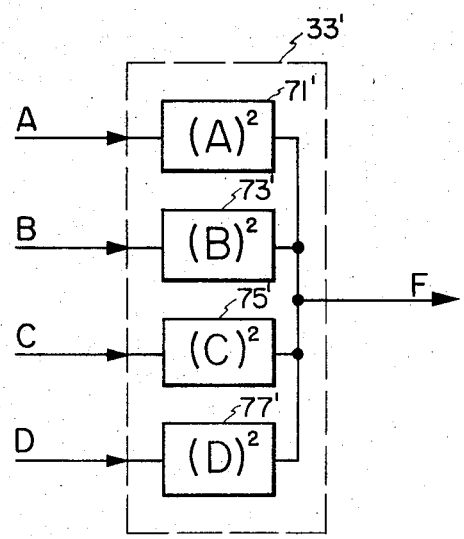
FIG. 5 is a schematic diagram showing another electrical arrangement for one of the circuits of FIG. 3.

FIG. 5 shows an alternate arrangement 33' of the signal processing circuit 33 shown in FIG. 1. In the signal processing circuit 33', squaring circuits 71', 73', 75' and 77' are substituted for the absolute value circuits 71, 73, 75 and 77 of the signal processor 33. Basically, the same function is performed in that a positive signal is provided for each of the difference signals A, B, C, and D which are in turn summed to provide the output focus signal F.

Figure 6:
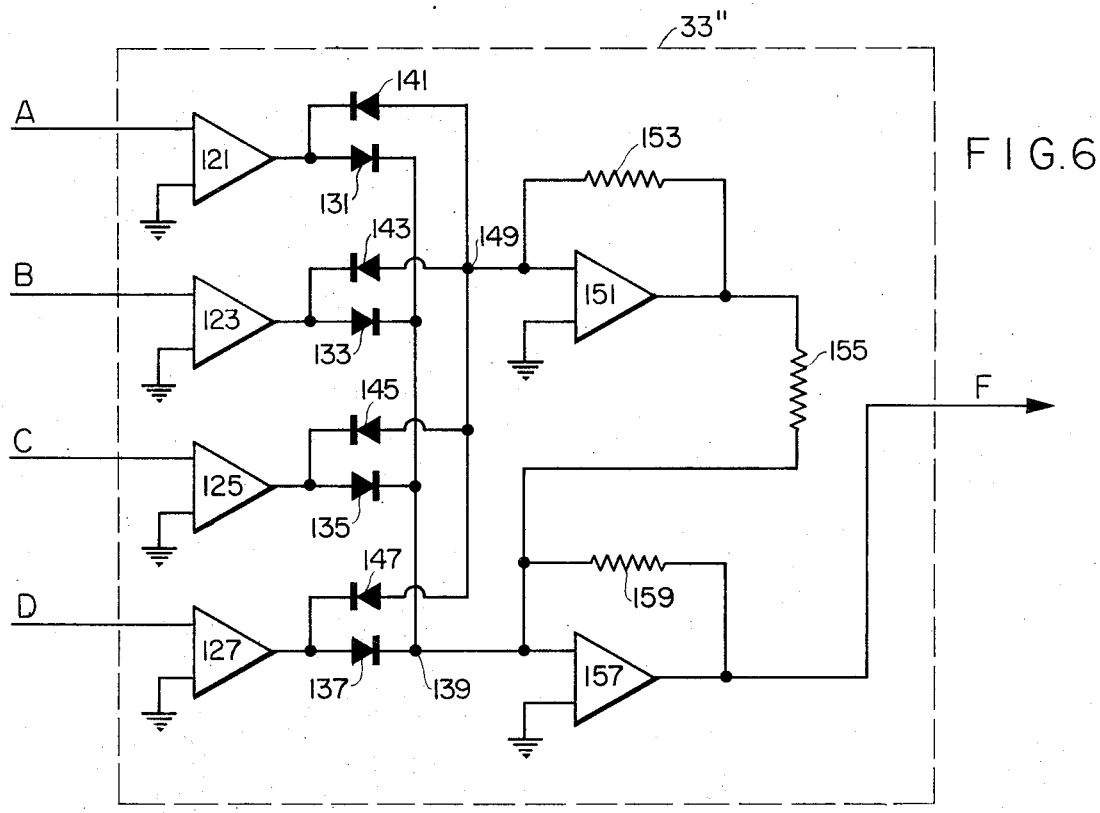
FIG. 6 is a schematic diagram showing yet another arrangement of one of the circuits of FIG. 3.

FIG. 6 shows still another arrangement 33'' for the signal processor 33 of FIG. 1. Basically, the signal processing circuit 33'' includes a rectifier and summer circuit in place of the absolute value circuits or squaring circuits hereinbefore disclosed. The difference signals A, B, C and D are applied to a first input terminal of separate amplifying devices 121, 123, 125 and 127, respectively. The second input terminals of the amplifying devices 121, 123, 125 and 127 are connected to a common reference potential or ground. The output terminals of the amplifying devices are connected through the anode to cathode paths of corresponding diodes 131, 133, 135 and 137 to a common summing point 139. The output terminals of the amplifying devices 121, 123, 125 and 127 are also connected through the cathode to anode paths of another set of corresponding diodes 141, 143, 145 and 147 to a second summing junction 149. The second summing junction 149 is connected to a first input terminal of an inverting amplifier 151. The second input terminal of the amplifier 151 is connected to ground. The output terminal of the amplifier 151 is connected back to its first input terminal through a feedback resistor 153. The output terminal of the inverting amplifier 151 is also connected through a resistor 155 to the summing junction 139. The junction 139 is connected to the first input terminal of another amplifier 157, the second input terminal of which is connected to ground. The output terminal of the amplifier 157 is connected back to its first input terminal through a feedback resistor 159. The output terminal of the amplifier 157 provides the output focus signal F which is then applied to the control circuit shown in FIG. 1.

In operation, the positive difference signals are summed at the summing junction 139 and the negative difference signals are summed at the summing junction 149. The sum of the negative difference signals appearing at the terminal 149 is then inverted and added to the sum of the positive signals at the junction 139. That total sum is then amplified by the amplifier 157 to provide the output focus signal F.

Figure 7:
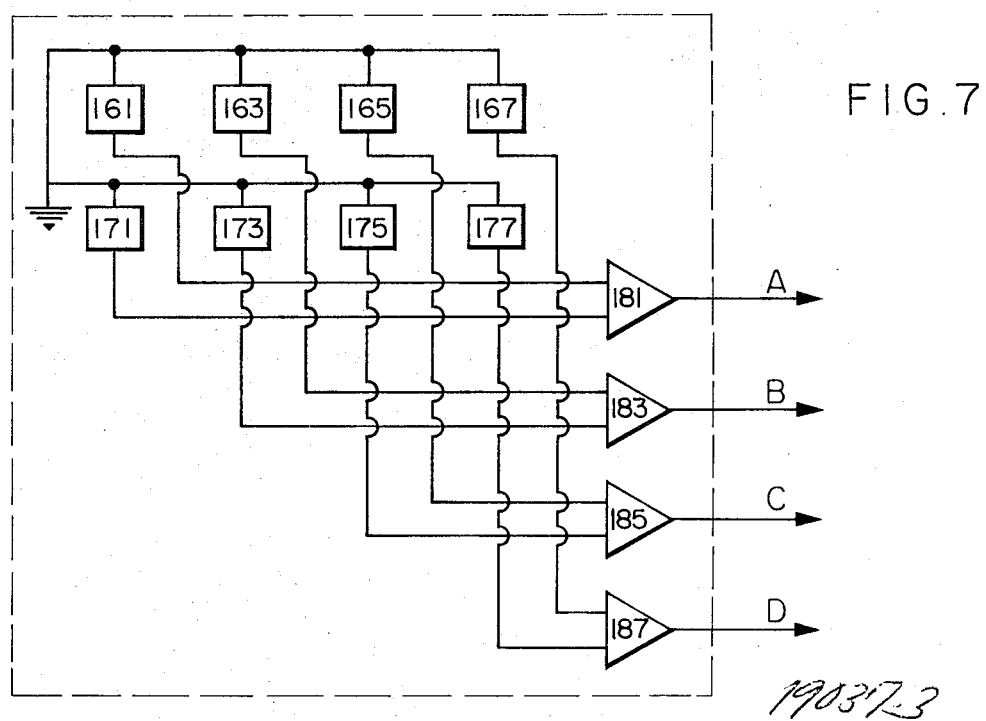
FIG. 7 is a schematic diagram showing another arrangement of the sensing means of the present invention.

FIG. 7 shows an arrangement for providing the difference signals A, B, C and D by using photovoltaic elements rather than the photoresistors shown in FIG. 3. The first sensing means includes four photovoltaic elements 161, 163, 165 and 167, and the second sensing means also includes four corresponding photovoltiac elements 171, 173, 175 and 177, respectively. Each photovoltaic element has one terminal commonly connected to ground. The other terminals of corresponding photovoltaic elements 161 and 171, 163 and 173, 165 and 175, and 167 and 177, are connected to separate input terminals of separate differential amplifiers 181, 183, 185 and 187, respectively, to provide the difference signals A, B, C and D, respectively. When the illumination falling on corresponding photovoltaic elements is substantially the same, the potential generated by each element is also substantially the same and the difference therebetween, as determined by the associated differential amplifier, will be substantially zero. Therefore, the difference signals, A, B, C and D as generated by the arrangement shown in FIG. 7 will be substantially identical to the difference signals A, B, C and D generated by the arrangement shown in FIG. 3 given the same environmental illumination stimuli.

Thus, there has been provided, in accordance with the present invention, an automatic focussing camera requiring only one lens system to accomplish the automatic focussing of a principal image and the proper exposing of the light sensitive film, without affecting the intensity of the light passing through the lens system to expose the light sensitive film.

The embodiments of the invention in which an exclusive property or privilege is claimed are defined as follows:

1. A camera means comprising:
   means defining a plane for receiving a light sensitive film;
   lens means for receiving light from an object to be photographed and forming a principal image of the object on the light sensitive film along a first light path;
   shutter means disposed between said lens means and the light sensitive film, said shutter means being selectively operable to open and close thereby selectively exposing said light sensitive film to the light from said lens means;
   first diversion means operable only when said shutter means is closed for reflecting said light from said lens means along a second light path;
   second diversion means in said second light path for receiving said reflected light and forming a plurality of discretely identifiable portions of radiation from which first and second auxiliary images are formed;
   first and second sensing means arranged to sense the intensities of said first and second auxiliary images, respectively, and to provide difference signals representative of the difference in intensities therebetween, which intensities vary as a function of the condition of focus of the principal image, and
   signal processing means connected to said first and second sensing means for providing an output signal indicative of the condition of focus of said principal image.

2. The camera means as set forth in claim 1 wherein said camera means further includes:
   means for moving said lens means whereby to vary the condition of focus of said principal image; and
   control means responsive to said output signal for controlling the position of said lens means whereby said lens means is moved to a positon which effects the best focus of said principal image.

3. The camera means as set forth in claim 1 wherein said first and second sensing means are fixedly mounted with respect to said camera means.

4. The camera means as set forth in claim 1 wherein said camera means is a single lens reflex camera including a reflex mirror having reflective and non-reflective faces, said first and second sensing means being mounted on the non-reflective face of said reflex mirror.

5. The camera means as set forth in claim 1 wherein each of said first and second sensing means includes a plurality of photoresponsive elements.

6. The camera means as set forth in claim 1 wherein said camera means includes a curtain-type shutter, said first diversion means being mounted on said curtain-type shutter in a position to lie in said first light path only when said shutter means is closed.

7. The camera means as set forth in claim 6 wherein said second diversion means includes first and second curvilinear reflector devices, said first curvilinear reflector device being operable to form said first auxiliary image on said first sensing means, and said second curvilinear reflecting device being operable to form said second auxiliary image on said second sensing means.

8. The camera means as set forth in claim 5 wherein said photoresponsive elements are photoresistors, each element of said first sensing means having a corresponding element in said second sensing means, the correspondence being based on the relative position of each light responsive element with respect to the sensing means of which it forms a part, said photoresistors of said first sensing means having a common terminal connected to means for connection to a potential of a first polarity, said photoresistors of said second sensing means having a common terminal connected to means for connection to a potential of an opposite polarity, the other terminals of corresponding photoresistors being connected together at separate common junctions to provide a plurality of said difference signals.

9. The camera means as set forth in claim 8 wherein said signal processing means includes squaring means responsive to each difference signal to provide a squared signal representative of the square of each difference signal and means for summing said squared difference signal to provide said output signals.

10. The camera means as set forth in claim 8 wherein said signal processing means includes absolute value means for providing an absolute value signal representative of the absolute value of each of said difference signals and means for summing said absolute valve signals to provide said output signal.

11. The camera means as set forth in claim 8 wherein said signal processing means includes a rectifier means fo rectifying each of said difference signals and summing means for summing all of said rectified difference signals to provide said output signal.

12. The camera means as set forth in claim 5 wherein said photoresponsive elements are photovoltaic cells.

13. The camera means as set forth in claim 12 wherein each of said photovoltaic cells includes a common terminal for connection to a common reference potential, each of said photovoltaic cells of said first sensing means having a corresponding photovoltaic cell in said second sensing means, the correspondence being based on the relative position of each photovoltaic cell with respect to the sensingmeans of which it forms a part, a plurality of differential amplifier means, the other terminals of corresponding photovoltaic cells being connected to separate terminals of separate ones of said differential amplifier means, said differential amplifier means being operable to provide said difference signals at the output terminals thereof.

14. The camera means as set forth in claim 13 wherein said signal processing means includes squaring means responsive to each difference signal for providing a squared signal representative of the square of each difference signal and summing means for summing said squared difference signals to provide said output signal.

15. The camera means as set forth in claim 13 wherein said signal processing means includes absolute value circuits for providing absolute value signals representative of the absolute value of each of said difference signals and summing means for summing said absolute value signals to provide said output signal.

16. The camera means as set forth in claim 13 wherein said signal processing means includes rectifier means for rectifying each of said difference signals and summing means for summing said rectified difference signals to provide said output signal.

* * * * *